United States Patent [19]

French

[11] 3,851,691
[45] Dec. 3, 1974

[54] PNEUMATIC TIRES
[75] Inventor: Tom French, Sutton Coldfield, England
[73] Assignee: Dunlop Limited, London, England
[22] Filed: Sept. 21, 1972
[21] Appl. No.: 290,814

[30] Foreign Application Priority Data
Sept. 29, 1971 Great Britain.................. 45306/71

[52] U.S. Cl. ............................................... 152/353
[51] Int. Cl. .......................................... B60c 13/00
[58] Field of Search................... 152/158, 352, 353

[56] References Cited
UNITED STATES PATENTS

| | | | |
|---|---|---|---|
| 803,345 | 10/1905 | Jeffery | 152/352 |
| 1,428,726 | 9/1922 | Warth | 152/352 |
| 1,874,120 | 8/1932 | Quynn | 152/352 |
| 2,108,329 | 2/1938 | Carter | 152/353 |
| 2,939,502 | 6/1960 | Hindin et al. | 152/352 |
| 3,486,547 | 12/1969 | Powers | 152/352 |
| 3,540,510 | 11/1970 | Smithkey, Jr. | 152/352 |
| 3,656,532 | 4/1972 | Roberts | 152/353 |

Primary Examiner—M. Henson Wood, Jr.
Assistant Examiner—Robert Saifer
Attorney, Agent, or Firm—Stevens, Davis, Miller & Mosher

[57] ABSTRACT

A tire in which the stiffness of the tread and sidewall structure and the width of the tread is such that in use deflated with the beads in position on a wheel rim and subjected to lateral force one sidewall is tensioned while the other is maintained as a fold constituting a cushion of rubber between the wheel rim flange and the road surface of which the following is a specification.

12 Claims, 6 Drawing Figures

FIG. 4
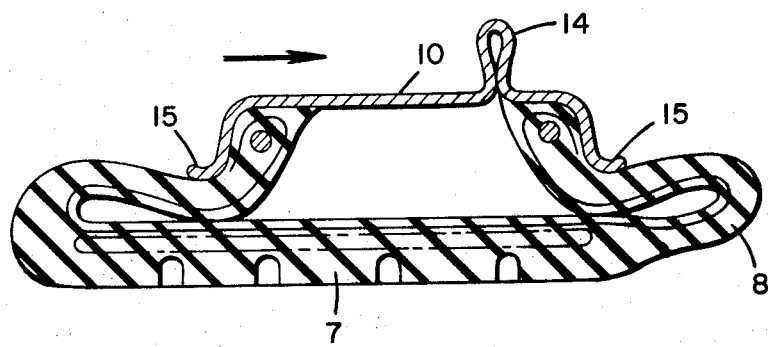
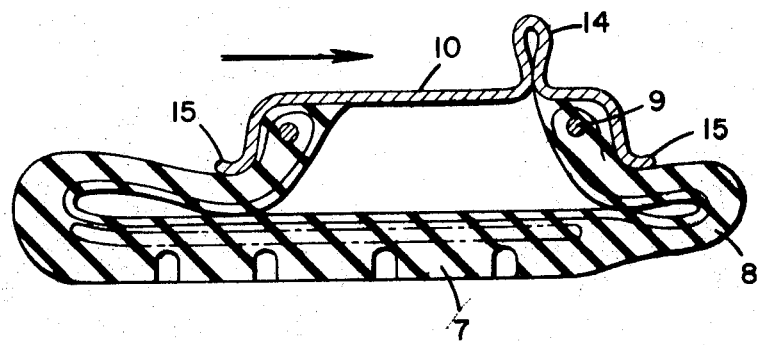
FIG. 5

PNEUMATIC TIRES

This invention relates to pneumatic tires.

For many years it has been considered desirable to produce a tire which would remain stable on its rim if punctured and thereby eliminate the hazard condition which arises if a tubed or tubeless tire of the presently used types punctured at speed.

Over the years numerous solutions have been proposed, centered mainly on the provision of a seocndary support inside the tire which will prevent total collapse of the tire onto the rim and will retain the tire beads in position on the rim. Such supports which are rigid, resilient cellular materials, resilient metal constructions, and second inflation chambers in reinforced envelopes inside the tire have all been proposed. None have been found entirely satisfactory for general use.

The assignees U.S. Pat. No. 3,739,829 of June 19, 1973 describes a tire and wheel assembly including a liquid lubricant for the interior surfaces of the tire. We have found that by provision of such a lubricant in a tire whose tread is wider than the rim and arranging for the tire beads to remain in contact with their seats on the rim it is possible to dispense with the need of separate internal supports of the kind mentioned above so that the wheel rim rides on the tire tread on the ground.

The present invention is concerned with the stability of such an assembly in the deflated condition under lateral forces such as are produced when a car is driven around a corner.

In a current conventional wheel-type tire assembly as used on a car there is virtually no lateral stability when deflated since steering of the wheel simply induces the tire beads to move into the well where they have lost contact with the rim and it is no longer possible to transmit controlled movements between the rim and the tire. This situation clearly is improved if the beads are held in position on their bead seats. However, even if this is done with a conventional tire-wheel assembly, when the tire is delfated and the wheel steered the sidewalls will not satisfactorily transmit the wheel movement to the tread band and control is very poor.

According to the present invention there is provided a pneumatic tire having sidewalls, bead portions and a tread the width of which is greater than the distance between bead heels of the tire when mounted on the wheel rim, the stiffness of the tread and sidewall structure together with the width of the tread being such that when in use with the tire deflated or substantially deflated and subject to a substantial lateral force one of the said sidewalls will be placed under tension in the region of the contact patch to restrain the tread from lateral movement while the other sidewall will be disposed in a folded state in the said region so as to be capable of acting as a buffer between a flange on a wheel rim on which the tire is mounted and a road surface.

In order to permit the least practical lateral movement of the tread of the tire in a deflated condition the side-walls are preferably as short as possible compatible with the section height of the tire so that one sidewall is tensioned, as mentioned above, after the minimum lateral movement has taken place.

Thus in a further aspect of the invention a pneumatic tire for use of a wheel rim having a pair of bead seats comprises sidewalls, beads and a braced tread portion having a tread width at its ground contacting surface at least 35 percent greater than the width between bead heels when the tire beads are positioned on the bead seats of said rim the width of the tread and the length of the sidewalls being such that the maximum section width of the tire measured internally when mounted on said rim and inflated to normal running pressure occurs at a distance, measured radially, not more than 40 percent of the total internal section height of the tire below the point of maximum section height of the tire. The braced tread portion preferably has a substantially flat ground-contacting surface. The shape of the tire described above is such that the tire sidewalls are of a short length relative to the height of the tire and the width of the tread. Ideally the sidewalls would make almost a direct line between the tread edges and the rim but practical considerations dictate that the sidewall must assume some curvature to prevent excessive stresses in the tire carcass.

The tire in the assembly of this invention is thus of a shape in which the maximum axial width of the tire is closer to the tread of the tire than in conventional tire/-wheel assemblies. Preferably the maximum internal axial width of the tire is at a distance below the tread of the tire which is no more than 30 percent of the maximum internal section height.

The breaker bracing the tread of the tire is preferably a breaker of high lateral stiffness e.g., a steel breaker comprising, for example, two layers of steel cord fabric of bias angle 18°–24°, to resist the tread from being folded under by lateral forces.

The tire preferably has a radial ply carcass, which may comprise textile or steel cord plies, since the radial plies more readily permit the sidewalls to fold without creasing when the tire is run in the deflated condition without extreme heat generation. The tire preferably has an aspect ratio of between 30 percent and 75 percent and particularly between 55 percent and 75 percent in order to obtain the desired riding characteristics and lateral stability when inflated.

The lateral accelerations generated in normal cornering of a car are of the order of 0.1g to 0.25g although higher accelerations can readily be generated if a car is cornered fiercely. In the present invention it is preferred that the tire when deflated should maintain a rubber buffer between both rim flanges and a road surface under lateral forces generated by lateral accelerations of at least 0.3g and more preferably 0.5g.

In use of the tire it is of the utmost importance that the beads should not be able to fall into a well on the wheel rim. Thus either a rim without a well should be used e.g., a split rim or a rim in which the well has been closed up by axial compression after tire mounting has been faciltated, or restraining means should be provided to prevent either bead falling into a well e.g., a bead spacer or spacer units or projections on the wheel rim. Even where a rim without a well is used it is advantageous to provide means to restrain particularly the laterally outer bear in its seat. One suitable arrangement is described in U.S. Pat. application No. 276,449 filed July 31, 1972.

In another aspect of the invention there is provided a pneumatic tire and wheel assembly comprising a wheel rim having a pair of bead seats and a pneumaticc tire comprising a tread portion, beads to be seated on said bead seats and sidewalls extending between the beads and the tread portion the tread being of a width greater than the distance between the heels of the beads of the tire when mounted on said rim the width of the tread and stiffness of the tread and sidewalls being such that, when in use with the beads in position on the bead seats on said rim the tire in the deflated condition and subject to a substantial lateral force will resist lateral movement of its tread relative to the rim one sidewall being placed under tension in the region of the contact patch the other sidewall being disposed in a folded state in the said region so as to be capable of acting as a buffer between the adjacent rim flange and a road surface.

The amount of sidewall available to be folded to form the rubber buffer in the non-tensioned sidewall is dependent to a large degree upon the width of the tread relative to the width of the rim. Thus preferably the tread width at the ground contacting surface in the inflated condition exceeds the rim width by at least 35 percent. A tread width of 6 inches has been found satisfactory in a radial ply car tire on a wheel rim of width 3½ inches.

Preferably the tread portion of the tire is braced by means of a suitable circumferential breaker assembly.

If a tire and wheel assembly is loaded when the tire is in a deflated condition the sidewalls of the tire fold and the internal surface of the lower sidewall adjacent the rim flange contacts the internal surface of the tire in the region adjacent the tire shoulder in the ground contact patch and provided that the tread of the tire is wider than the wheel rim and preferably suitably braced, e.g., by a breaker, the load is exerted on the ground by the tread. If the assembly is then run on a vehicle lateral forces arise particularly in cornering which tend to move the wheel rim laterally relative to the tire tread so that it is possible for the tread edge to move axially inwardly of its associated rim flange and eventually there is no rubber between the rim flange and the road surface. If the rim flange comes into contact with the road surface satisfactory control of the direction of the vehicle may be lost and the wheel may be severely damaged.

In subjection of the tire and wheel assembly of this invention to a lateral force, e.g., by cornering, the relationship of tread width, tread and sidewall stiffness and rim width is such that lateral movement of the tread is resisted by tensioning of the inner sidewall i.e. the inside sidewall relative to the corner, and until sufficient lateral force is applied to roll the tread a fold of rubber sidewall remains between the rim flange and the road surface. When the tread edge eventually begins to roll up away from the road under the pull of the inner sidewall the laterally outer sidewall will be placed under tension and will attempt to pull the outer bead away from its seat. At this stage the stability of the tire will be largely dependent upon the effectiveness of the means used to restrain the bead from moving across the wheel rim.

Variation of stiffness of the sidewall region at the widest part of the tire is limited in scope since the sidewall must be flexible to obtain an acceptable riding behaviour. The uppermost and/or lower regions of the sidewall may be stiffened to some extent to resist formation of sharp folds in these regions and increase the resistance to lateral movement of the tread.

Where bead restraining means separate from the main tire rim structure are used they may be studs or other projectiions on the rim, or a bead spacer ring, or individual bead spacers may be provided which are combined with enclosing means for a lubricant for the internal surfaces of the tire as described in U.S. Pat. application 150,627 filed June 7, 1971. The latter arrangement is particularly useful when the rim has a well. Preferably the beads of the tire are provided with a toe portion extended into a radially inwardly extending annulus comprising elastomeric material and the rim includes a circumferentially extending notch in which the annulus rests when the tire is on the rim as is described in our U.S. Pat. application No. 276,449 filed July 31, 1972. This is particularly useful when a split or axially compressed rim or other type of rim having a notch suitable to receive the annulus is used.

Two tires in accordance with the invention will now be described, by way of example only, with reference to the accompanying drawing in which:

FIG. 4 is a view similar to FIG. 3 with the tire in a loaded-uninflated condition with moderate lateral force in the direction of the arrow so that the inner sidewall is coming into tension.

FIG. 5 is a view similar to FIG. 4 with the tire being subjected to an increased lateral force in the direction of the arrow so that there is increased tension in the inner sidewall with the breaker beginning to distort.

Figure 1:
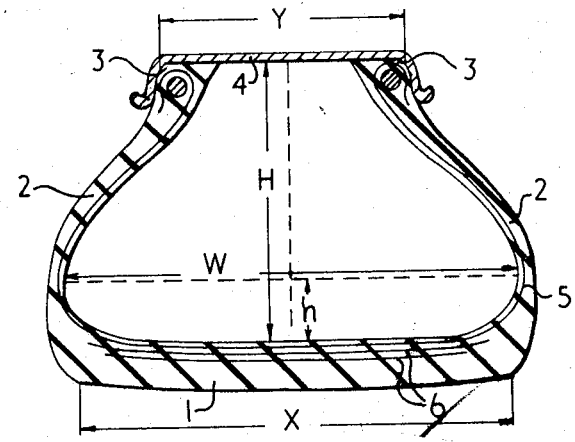
FIG. 1 shows schematically in section through the ground contact patch of a tire wheel assembly in accordance with the invention in the inflated condition.

The assembly consists of a tire having a tread 1, sidewalls 2 and beads 3 mounted on a wheel rim shown schematically at 4. The width X of the tread 1 is 80 percent greater than the width Y of the wheel rim between its flanges. The tire contains a radial ply carcass 5 of textile cords e.g., rayon and a pair of steel breakers layers 6 of bias angle of 20°.

The sidewalls 2 of the tire are of a short length which is consistent with having a carcass without excessively low radius curves in its inflated state. The maximum internal section width W is a distance $h$ below the highest point on the interior of the tire carcass, $h$ being 23 percent of the internal section height H.

Figure 2:
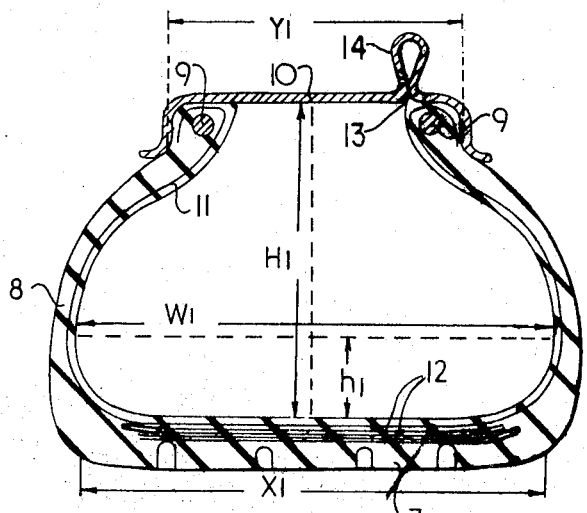
FIG. 2 shows a similar view of an inflated tire having a reduced ratio of tread width to rim width mounted on a crimped rim.

FIG. 2 shows a pneumatic tire having a tread 7, sidewalls 8 and 9 mounted on a crimped wheel rim 10. The tire contains a radial ply carcass 11 of textile cords e.g., rayon and a pair of folded textile e.g., rayon cord fabric breaker layers 12 of bias angle 16°.

The width $X_1$ of the tread of the tire is 54 percent greater then the width $Y_1$ of the wheel rim between its flanges. The sidewalls 2 are of smoothly curved shape but are of a short length with the result that the maximum internal section width $W_1$ of the tire is a distance $h_1$ below the highest point on the interior of the tire carcass $h_1$ being 17.5 percent of the internal section height $H_1$.

Each bead 9 of the tire is provided with an extended toe portion 13 in the form of a radially inwardly extending rubber annulus which, in the case of the laterally outer bead, rests in the notch in the rim 10 resulting from the crimp 14 in the rim. In the case of the laterally inner bead the portion 13 is stretched on the rim 10 and acts to aid the seal between bead and rim when the tire is deflated.

Figure 3:
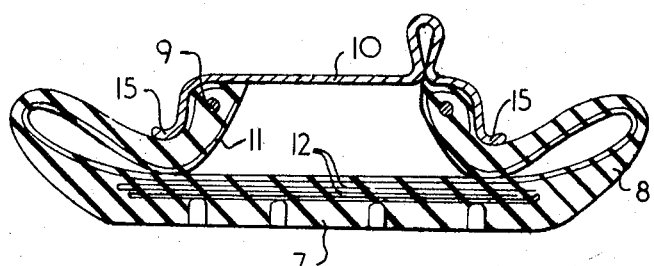
FIG. 3 is a similar view showing the tire of FIG. 2 in the load-uninflated condition.

When the tire is loaded in the uninflated condition as shown in FIG. 3 the sidewalls 8 fold outwardly and the rim flanges 15 press down on the interior of the tire tread 7 through the portion of the lower sidewall of the tire radially outwardly of the flanges.

FIG. 4 illustrates schematically the effect of exerting a lateral force e.g., by a vehicle cornering, on a rim 10, on which is mounted a tire having inner and outer sidewalls 16 and 18 and a tread 17 reinforced by a breaker assembly. The direction of the force is shown by the arrow and is that which would be produced if the assembly were on the offside of the cornering vehicle. As can be seen the rim 10 moves relative to the tire tread 17 in the direction of the force. The effect of this is to move the fold in the inner sidewall 16 of the tire towards the tire tread 17 and that in the outer sidewall 18 away from the tire tread. The resistance of the inner sidewall 16 of the tire to this folding increases as the fold moves towards the edge of the breaker until, in order to move the rim further the edge of the breaker assembly and hence the tire tread itself has to be rolled away from the road, the force required then being exceedingly high.

Since the tread 17 of the tire is wider than the distance between the rim flanges and the sidewalls are short the restraining effect of the tire is rapidly brought into play as the rim moves over.

Thus it has been found that in the case of a 185 × 13 tire of the profile and on a rim of the width shown in FIG. 2, with a 2-ply rayon cord carcass and folded rayon cord fabric breaker layers of bias angle 16° the tire maintains a fold of rubber sidewall between the outer rim flange and the road under a lateral acceleration of 0.3g, thus preventing the rim flange from contacting the ground. It was also found that under a lateral acceleration of 0.5g, although the fold of rubber sidewall is no longer directly beneath the sidewall there is still sufficient support to prevent the rim flange contacting the ground on a smooth surface. The importance of this is that while the rim flange is prevented from contacting the ground a high degree of control may be maintained on the vehicle and the rim is very much less likely to be damaged in any way.

It will be appreciated that the tire and wheel assembly of this invention is intended to be used with a lubricant to reduce internal friction in the tire when the assembly is run in the deflated or substantially underinflated condition. Preferably the lubricant is a flowable liquid lubricant as described in U.S. Pat. No. 3,739,829 and/or the tire may be provided with an internal coating of lubricant as described in U.S. Pat. application No. 150,558 filed June 7, 1971. Preferably the lubricant is enclosed in the tire and wheel assembly in an enclosing means which will release the lubricant in the tire when the tire becomes deflated or substantially under-inflated as described in U.S. Pat. application No. 150,627 filed June 7, 1971.

Having now described my invention, what I claim is:

1. A pneumatic tire having an aspect ratio of less than 75 percent comprising bead portions, a braced tread portion having a substantially flat ground contacting surface and a pair of flexible sidewalls of mutually equal length extending between the bead portions and the tread portion; the tire, when mounted on a wheel rim and normally inflated having a cross section wherein:
   1. the tread portion has a width greater than the distance between the bead heels in a ratio of at least 1.35 to 1;
   2. the length of the sidewalls is such that the mixximum internal section width of the tire occurs, at a distance measured radially, not greater than 40 percent of the total internal section height from the tread portion;

so that when the tire is deflated and subjected to a lateral force a restraint to lateral movement of the tread portion in relation to its wheel is caused by one sidewall being placed in tension between the tread contact patch and its bead and the other sidewall being folded between the edge of the tread portion and its bead, the lateral stiffness of the tread portion tending to resist any greater folding.

2. A pneumaticc tire according to claim 1 in which the sidewalls are as short as possible compatible with the section height of the tire so that one sidewall is tensioned after the minimum lateral movement has taken place.

3. A pneumatic tire according to claim 1 in which the maximum internal section width of the tire is at a distance below the tread of the tire which is no more than 40% of the maximum internal section height.

4. A pneumatic tire according to claim 1 in which the tire when deflated will maintain a rubber buffer between both rim flanges and a road surface under lateral forces generated by lateral accelerations of at least 0.3g.

5. A pneumatic tire according to claim 1 whose tread portion is braced by means of a circumferential breaker assembly.

6. A pneumatic tire according to claim 5 in which the breaker bracing the tread of the tire is a breaker of high lateral stiffness to resist the tread from being folded under by lateral forces when the tire is used deflated.

7. A pneumatic tire according to claim 1 having a radial ply carcass comprising textile or steel cord plies.

8. A pneumatic tire according to claim 1 having an aspect ratio between 30 percent and 75 percent.

9. A pneumatic tire according to claim 8 in which said aspect ratio is between 55 percent and 75 percent.

10. A pneumatic tire and wheel assembly capable of being run in a deflated condition and resisting lateral forces thereon comprising:
   a. a rim having a pair of annular flanges defining bead seats for the tire;
   b. means to prevent the tire from becoming dislodged from the wheel and to maintain the tire beads in the seats;
   c. a tire mounted on the wheel having beads, a braced tread portion having substantial lateral stiffness and a pair of flexible sidewalls extending between said tread portion and said beads;
   d. the tire when normally inflated having a cross section wherein:
      1. the tread width is greater than the width between the bead heels in a ratio of at least 1.35 to 1;

2. the length of the sidewalls is such that the maximum internal section width of the tire occurs, at a distance measured radially, not greater than 40% of the total internal section height from the tread portion;

so that when the tire is deflated and subjected to a lateral force a restraint to lateral movement of the tread portion in relation to the wheel is caused by one sidewall being placed in tension between the tread contact patch and its bead and the other sidewall being folded between the edge of the tread portion and its bead, the lateral stiffness of the tread portion tending to resist any greater folding.

11. A pneumatic tire having an aspect ratio of less than 75 percent comprising bead portions, a braced tread portion having a substantially flat ground contacting surface and a pair of flexible sidewalls of mutually equal length extending between the bead portions and the tread portion, the tire when mounted on a wheel rim and normally inflated having a cross section wherein a. the tread portion has a width greater than the distance between the bead heels in a ratio of at least 1.35 to 1;

b. the shape of the tire is such that the sidewalls are of a short length relative to the section height of the tire and the width of the tread, so that when the tire is deflated and subjected to a lateral force a restraint to lateral movement of the tread portion in relation to its wheel rim is caused by one sidewall being placed in tension between its edge of the tread and its bead while the other sidewall is folded between its bead and its edge of the tread, the lateral stiffness of the tread portion tending to resist any greater folding.

12. A pneumatic tire and rim assembly, the tire having an aspect ration of less than 75 percent comprising bead portions, a braced tread portion having a substantially flat ground contacting surface and a pair of flexible sidewalls of mutually equal length extending between the bead portions and the tread portion, the tire when normally inflated having a cross section wherein a. the tread portion has a width greater than the width of the rim and in a ratio of at least 1.35 to 1;

b. the shape of the tire is such that the sidewalls are of a short length relative to the section height of the tire and the width of the tread;

so that when the tire is deflated and subjected to a lateral force a restraint to lateral movement of the tread portion in relation to the rim is caused by one sidewall being placed in tension between its edge of the tread and its bead while the other sidewall is folded between its bead and its edge of the tread, the lateral stiffness of the tread portion tending to resist any greater folding.

* * * * *

UNITED STATES PATENT OFFICE
CERTIFICATE OF CORRECTION

Patent No. 3,851,691　　　　　　　　Dated December 3, 1975

Inventor(s) Tom FRENCH

It is certified that error appears in the above-identified patent and that said Letters Patent are hereby corrected as shown below:

Column 1, line 41, delete "delfated", insert --deflated--.

Column 2, line 53, delete "faciltated", insert --facilitated--.

Figure 6:
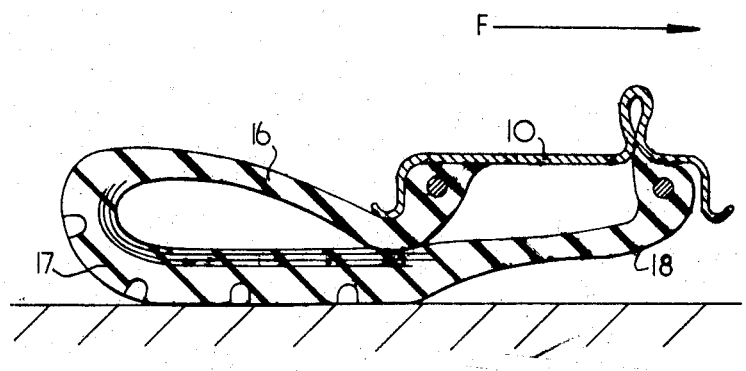
FIG. 6 is a similar view in section of a tire and wheel assembly showing the effect of an extremely high lateral force on the rim in which the assembly shown in FIGS. 3, 4 or 5 so that the breaker is now highly distorted.

Column 5, line 11, delete "FIG.4", insert --FIG.6--.

Column 6, line 22, delete "pneumaticc", insert --pneumatic--.

Signed and sealed this 15th day of July 1975.

(SEAL)
Attest:

RUTH C. MASON
Attesting Officer

C. MARSHALL DANN
Commissioner of Patents
and Trademarks